United States Patent
Suciu et al.

(10) Patent No.: US 9,163,562 B2
(45) Date of Patent: *Oct. 20, 2015

(54) CONSTANT SPEED PUMP SYSTEM FOR ENGINE ECS LOSS ELIMINATION

(75) Inventors: Gabriel L. Suciu, Glastonbury, CT (US); Brian D. Merry, Andover, CT (US); Jorn A. Glahn, Manchester, CT (US); Christopher M. Dye, Glastonbury, CT (US)

(73) Assignee: United Technologies Corporation, Hartford, CT (US)

(*) Notice: Subject to any disclaimer, the term of this patent is extended or adjusted under 35 U.S.C. 154(b) by 846 days.

This patent is subject to a terminal disclaimer.

(21) Appl. No.: 13/419,660

(22) Filed: Mar. 14, 2012

(65) Prior Publication Data

US 2013/0239582 A1     Sep. 19, 2013

(51) Int. Cl.
| | |
|---|---|
| *F02C 7/14* | (2006.01) |
| *F02C 3/09* | (2006.01) |
| *F02C 9/16* | (2006.01) |
| *F02C 7/32* | (2006.01) |
| *F02C 7/36* | (2006.01) |
| *F02C 6/08* | (2006.01) |
| *F01D 15/08* | (2006.01) |

(52) U.S. Cl.
CPC . *F02C 6/08* (2013.01); *F01D 15/08* (2013.01); *F02C 7/32* (2013.01); *F02C 7/36* (2013.01); *Y02T 50/671* (2013.01)

(58) Field of Classification Search
CPC ............. F02C 7/14; F02C 3/09; F02C 3/10; F02C 9/16; F02C 6/04; F02C 6/08; F02C 7/32; F02C 7/36
USPC .............. 60/792, 226.1, 262, 39.08, 266, 802
See application file for complete search history.

(56) References Cited

U.S. PATENT DOCUMENTS

| | | | | |
|---|---|---|---|---|
| 2,598,674 A | * | 6/1952 | Burgess | 60/243 |
| 2,620,123 A | * | 12/1952 | Parducci | 417/369 |
| 3,151,658 A | * | 10/1964 | Johnson | 60/39.281 |
| 3,503,207 A | * | 3/1970 | Strub | 60/667 |
| 3,680,309 A | | 8/1972 | Wallace, Jr. | |
| 3,984,978 A | * | 10/1976 | Alderson | 60/422 |
| 4,046,029 A | * | 9/1977 | Sugden | 475/72 |
| 4,120,152 A | * | 10/1978 | Jackson, III | 60/221 |
| RE31,835 E | | 2/1985 | Rannenberg | |
| 4,627,237 A | * | 12/1986 | Hutson | 60/487 |
| 4,713,982 A | * | 12/1987 | Fluegel et al. | 475/74 |
| 4,754,940 A | * | 7/1988 | Deter | 244/75.1 |
| 5,114,103 A | | 5/1992 | Coffinberry | |
| 5,131,227 A | * | 7/1992 | Iseman | 60/422 |
| 5,357,742 A | * | 10/1994 | Miller | 60/785 |
| 5,442,905 A | | 8/1995 | Claeys et al. | |

(Continued)

*Primary Examiner* — William H Rodriguez
*Assistant Examiner* — Eric Linderman
(74) *Attorney, Agent, or Firm* — Bachman & LaPointe, P.C.

(57) ABSTRACT

A gas turbine engine comprises a fan configured to produce propulsive thrust from a fan discharge air stream. A bypass duct is located between a cowl and an engine core, the bypass duct is fluidly coupled to the fan. An impeller pump has an intake manifold fluidly coupled to the bypass duct. The impeller pump has an outlet coupled to an outlet duct fluidly coupled to an environmental control system, wherein the impeller pump is configured to raise pressure of the fan discharge air stream and pump the fan discharge air into the environmental control system for cooling. An integrated drive pump is connected to the impeller pump for driving the impeller pump at a constant speed. The integrated drive pump is positioned on the engine core.

10 Claims, 3 Drawing Sheets

(56) References Cited

U.S. PATENT DOCUMENTS

| | | | |
|---|---|---|---|
| 5,447,026 A * | 9/1995 | Stanley | 60/372 |
| 5,987,877 A * | 11/1999 | Steiner | 60/39.08 |
| 6,128,896 A | 10/2000 | Saiz | |
| 6,189,313 B1 * | 2/2001 | Cass et al. | 60/796 |
| 6,205,770 B1 * | 3/2001 | Williams et al. | 60/204 |
| 7,500,365 B2 | 3/2009 | Suciu et al. | |
| 7,574,859 B2 * | 8/2009 | Epshteyn | 60/413 |
| 7,578,136 B2 | 8/2009 | Derouineau et al. | |
| 7,805,947 B2 | 10/2010 | Moulebhar | |
| 8,430,361 B2 * | 4/2013 | Raymond et al. | 244/172.2 |
| 8,602,717 B2 * | 12/2013 | Suciu et al. | 415/1 |
| 2006/0042227 A1 * | 3/2006 | Coffinberry | 60/226.1 |
| 2006/0117734 A1 * | 6/2006 | Larkin et al. | 60/226.1 |
| 2006/0248900 A1 * | 11/2006 | Suciu et al. | 60/802 |
| 2007/0144138 A1 * | 6/2007 | Dooley | 60/39.08 |
| 2008/0121376 A1 * | 5/2008 | Schwarz et al. | 165/104.28 |
| 2009/0000308 A1 * | 1/2009 | Cloft et al. | 60/802 |
| 2009/0139243 A1 * | 6/2009 | Winter | 60/802 |
| 2009/0205341 A1 * | 8/2009 | Muldoon | 60/792 |
| 2010/0024434 A1 * | 2/2010 | Moore et al. | 60/788 |
| 2010/0043386 A1 * | 2/2010 | Perveiler et al. | 60/39.5 |
| 2010/0071345 A1 * | 3/2010 | Silver et al. | 60/269 |
| 2010/0107603 A1 * | 5/2010 | Smith | 60/267 |
| 2010/0236242 A1 * | 9/2010 | Farsad et al. | 60/685 |
| 2010/0242496 A1 * | 9/2010 | Cass et al. | 60/802 |
| 2011/0120126 A1 * | 5/2011 | Srinivasan | 60/641.7 |
| 2011/0131999 A1 * | 6/2011 | Gao et al. | 60/782 |
| 2011/0203293 A1 * | 8/2011 | Glahn | 60/785 |
| 2011/0289936 A1 * | 12/2011 | Suciu et al. | 60/802 |
| 2012/0107104 A1 * | 5/2012 | Suciu et al. | 415/177 |
| 2012/0159960 A1 * | 6/2012 | Brust et al. | 60/778 |
| 2012/0159966 A1 * | 6/2012 | Suciu et al. | 60/802 |
| 2012/0272658 A1 * | 11/2012 | Murphy | 60/783 |
| 2013/0047623 A1 * | 2/2013 | Suciu et al. | 60/772 |
| 2013/0047624 A1 * | 2/2013 | Suciu et al. | 60/772 |
| 2013/0086922 A1 * | 4/2013 | Suciu et al. | 60/802 |
| 2013/0097992 A1 * | 4/2013 | Suciu et al. | 60/39.83 |
| 2013/0098046 A1 * | 4/2013 | Suciu et al. | 60/772 |
| 2013/0098047 A1 * | 4/2013 | Suciu et al. | 60/772 |
| 2013/0098057 A1 * | 4/2013 | Suciu et al. | 60/779 |
| 2013/0098059 A1 * | 4/2013 | Suciu et al. | 60/783 |
| 2013/0098060 A1 * | 4/2013 | Suciu et al. | 60/783 |
| 2013/0098067 A1 * | 4/2013 | Suciu et al. | 60/802 |
| 2013/0239582 A1 * | 9/2013 | Suciu et al. | 60/785 |
| 2013/0239583 A1 * | 9/2013 | Suciu et al. | 60/785 |
| 2013/0239584 A1 * | 9/2013 | Suciu et al. | 60/792 |
| 2013/0239588 A1 * | 9/2013 | Suciu et al. | 60/806 |
| 2014/0026592 A1 * | 1/2014 | Beier | 60/796 |
| 2014/0366539 A1 * | 12/2014 | Hissong et al. | 60/648 |

* cited by examiner

CONSTANT SPEED PUMP SYSTEM FOR ENGINE ECS LOSS ELIMINATION

BACKGROUND

The present disclosure relates to the provision of further performance capability on a gas turbine engine by integrating a constant-speed device into an environmental control system.

Gas turbine engines typically require air-driven systems to provide high-pressure air for use in the passenger cabin via an environmental control system (ECS). ECS air is provided by bleed ports on the engine, typically on the high pressure compressor (HPC), which may result in some performance loss. ECS air is routed through a series of pipes and valves, then through a pre-cooler near the top of the engine/aircraft interface to cool air prior to entry into the aircraft wing, and then through the aircraft air cycle machine (ACM) for use in the cabin.

SUMMARY

In accordance with the present disclosure, there is provided a gas turbine engine which broadly comprises an impeller pump for supplying air to an environmental control system, and a speed control pump connected to the impeller pump for driving the impeller pump at a constant speed.

Further in accordance with the present disclosure, there is provided a system for providing air to an environmental control system, which system broadly comprises an engine having a drive shaft and an air supply pump driven by the drive shaft for supplying air to the environmental control system.

Still further in accordance with the present disclosure, there is provided an engine which broadly comprises an engine core, a speed control pump positioned on the engine core, a spool, a towershaft connected to the spool via a drive gear and connected to said speed control pump, and a pump for supplying air to an environmental control system connected to said speed control pump.

Other details of the constant-speed pump system for environmental control system loss elimination are set forth in the following detailed description and the accompanying drawings wherein like reference numerals depict like elements.

DETAILED DESCRIPTION

In accordance with the present disclosure, there is provided an impeller-driven pump system and a constant speed device for providing air to an environmental control system.

As described herein, an impeller pump is used to raise pressure of flow from an engine fan stream for use as air system flow. ΔP for an engine environmental control system is provided by an impeller, driven off a towershaft, such as a low spool towershaft. The use of an impeller is enabled by use of an integrated drive pump (IDP), similar in function to that used in an aircraft integrated drive generator (IDG). The IDP converts variable speed input from the towershaft into constant-speed output power to drive the impeller pump. This allows for a better impeller sizing. Performance benefits are realized for utilizing the more operationally robust low spool for a power source. Flow from the impeller pump discharge is sent via a single pipe up to the aircraft pre-cooler and ACM.

The system described herein may be incorporated with an engine accessory gearbox (AGB) using the existing towershaft as a means of drive power. The system may be incorporated into the AGB housing itself, towershaft housing, or layshaft housing for reduced packaging space if the engine configuration permits.

Figure 1:
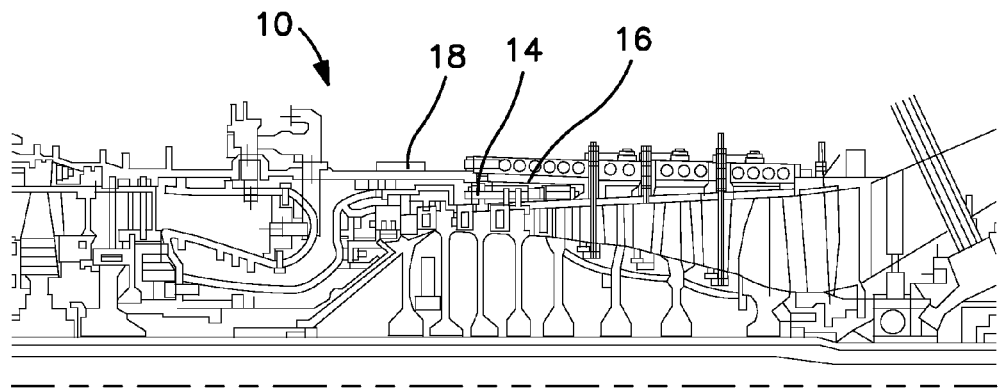
FIG. 1 is a sectional view of a gas turbine engine.
Figure 2:
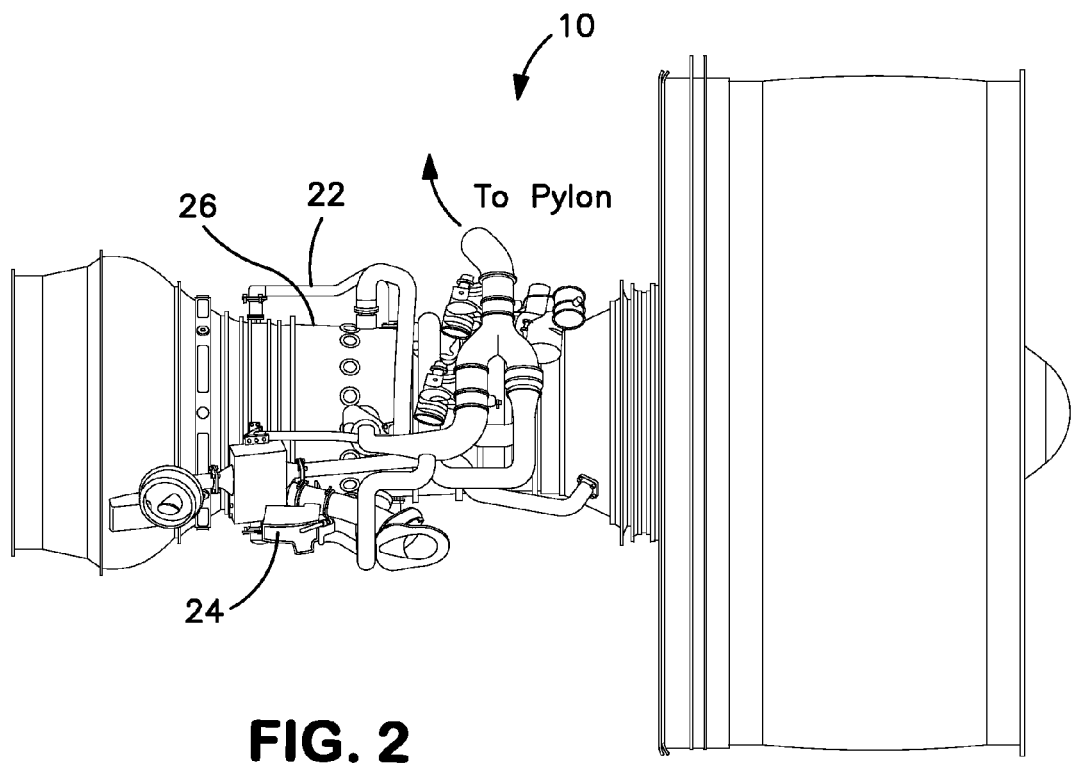
FIG. 2 is a side view of the engine of FIG. 1.

Referring now to FIGS. 1 and 2, there is shown a gas turbine engine 10 having a high pressure compressor 14. As can be seen from FIG. 1, there is at least one forward bleed 16, usually two forward bleeds, for the environmental control system and at least one aft bleed 18, usually two aft bleeds for the environmental control system. As can be seen from FIG. 2, the environmental control system includes a number of pipes 22 and valves 24 which may include a system on-off valve, a high-pressure on-off valve, and a low pressure anti-backflow check valve. Typically, the environmental control system requires considerable space around the engine core case 26.

Figure 3:
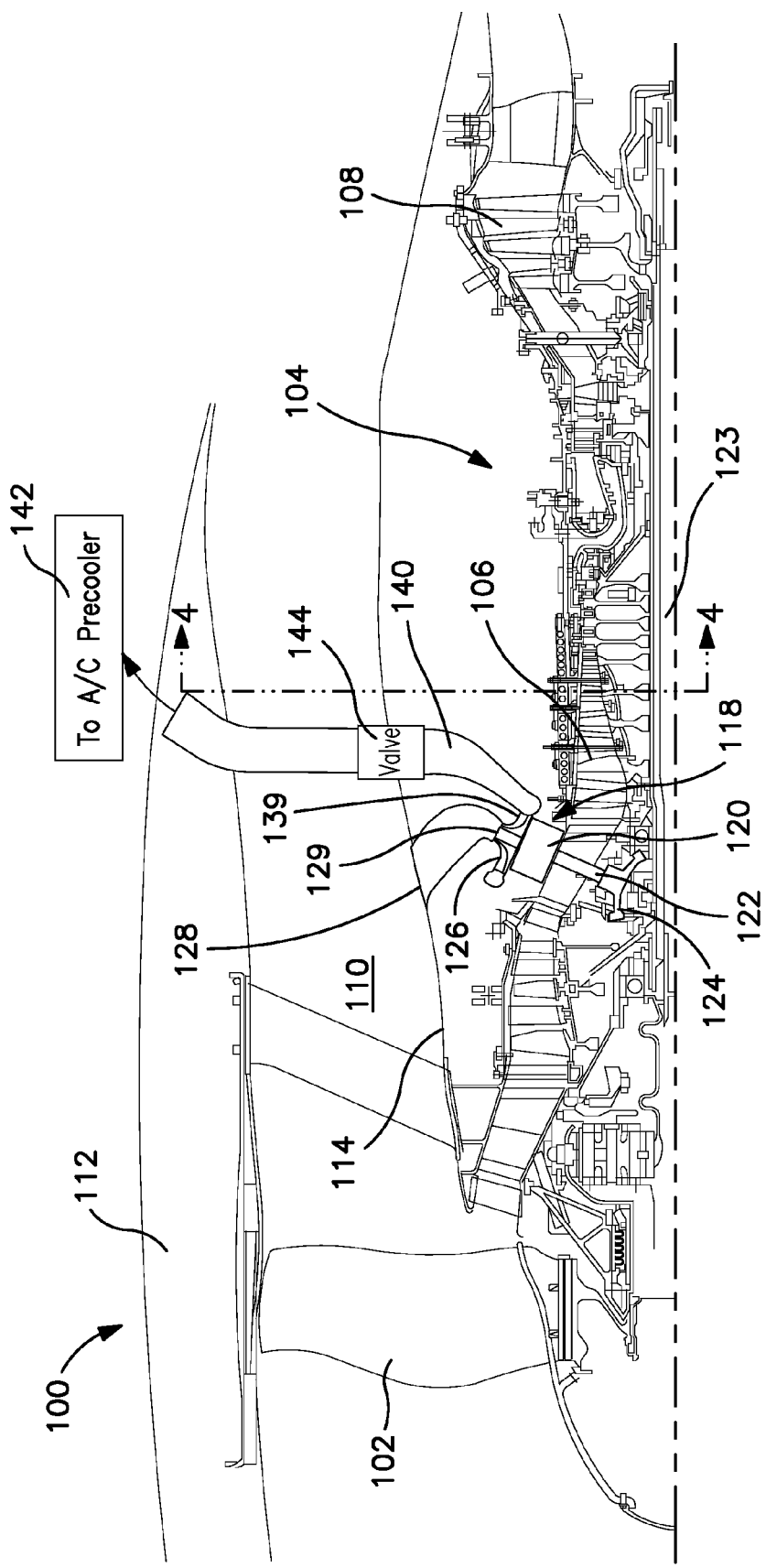
FIG. 3 is a sectional view of an engine having the constant-speed pump system of the present disclosure.

FIG. 3 illustrates the pump system 118 of the present disclosure as installed on a gas turbine engine 100 having a fan 102, a core 104, with a compressor section 106 and a turbine section 108. As can be seen from the figure a bypass flow duct 110 is created between the cowl 112 and the core casing 114.

The pump system 118 includes an integrated drive pump 120 for providing a constant speed drive. The pump 120 is connected to a towershaft 122 at a first end. The towershaft 122 is connected to a spool 123 of the engine via drive gear 124. The spool 123 may be a high spool such as that connecting the high pressure compressor to the high pressure turbine section of the engine. Alternatively, the spool 123 may be a low spool such as that connecting the fan to the low pressure turbine section of the engine. An impeller pump 126 for the environmental control system is attached to a second end of the integrated drive pump 120. The impeller pump 126 may be a centrifugal impeller for ΔP generation. Alternatively, the impeller pump 126 may be an axial pump. The integrated drive pump 120 drives the impeller pump 126 at a constant speed. The integrated drive pump 120 may be an integrated drive pump (IDP), similar in function to that used in an aircraft integrated drive generator (IDG). The IDP converts variable speed input from the towershaft 122 into constant-speed output power to drive the impeller pump 126.

The pump system 118 further includes an intake manifold 128 for the impeller pump 126. Cool air from the bypass flow duct 110 is drawn into the intake manifold 128 by operation of the impeller pump 126 and the pump 120 and is delivered to the inlet 129 of the impeller pump 126.

The environmental control system receives discharge air from the impeller pump 126 via the single pipe or duct 140 connected to the outlet 139 of the impeller pump. The discharge air flows through the pipe 140 to an aircraft precooler 142 which forms part of the thermal management system. A valve 144 may be incorporated into the pipe 140 to control the flow of discharge air through the duct 140. For example, the valve 144 may shut off flow entirely if desired.

Figure 4:
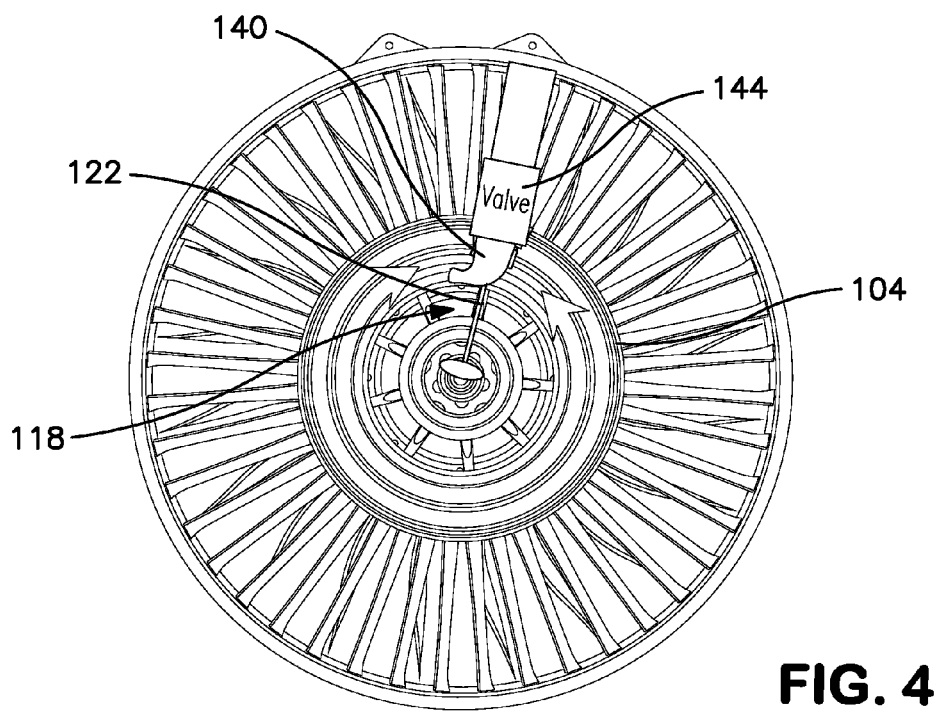
FIG. 4 is a view of the engine of FIG. 3 taken along lines 4-4 in FIG. 3.
Figure 5:
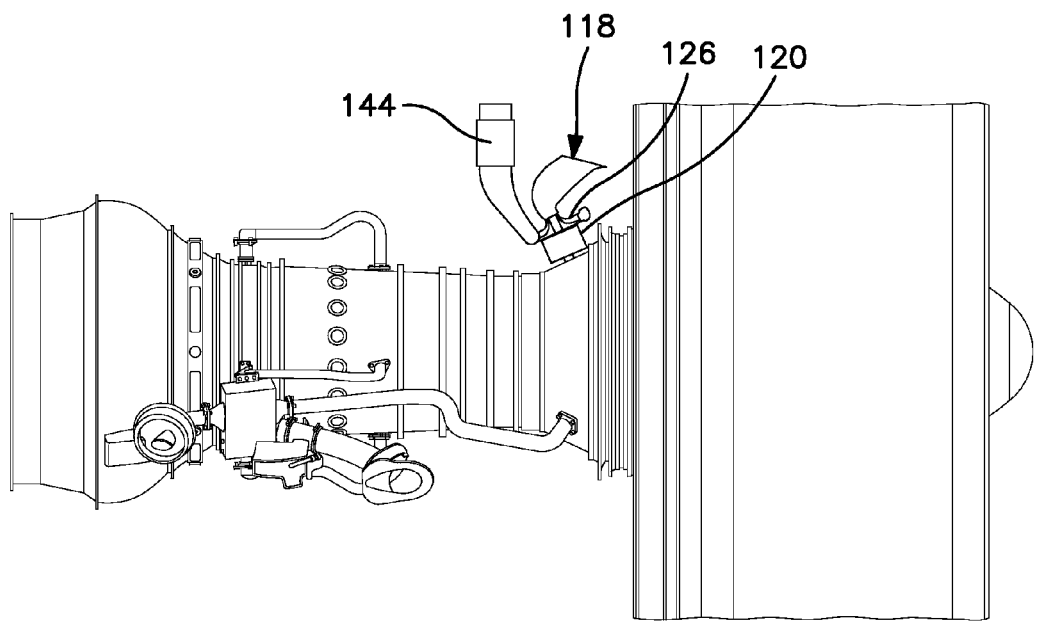
FIG. 5 is a side view of an engine having the constant-speed pump system of FIG. 3.

As shown in FIG. 4, the pump system 118 may be located at any convenient tangential location on the engine core 104. Further as shown in FIG. 5, use of the pump system 118 of the present invention reduces the amount of pipes and valves that are present in other engines.

The system described herein provides general benefits to the engine itself and engine externals system. ECS mass flow is approximately 1 lb per second (approximately 0-453 kg per second), and efficiency gains from not bleeding air from the high pressure compressor are about 2% if power is instead extracted from the low spool, with reduced distortion due to lack of environmental control system bleeds. Exhaust gas temperature (EGT) at idle may also decrease by more than 200 degrees F. (93.3 degrees C.). Overall ECS system weight will decrease due to the reduced size of ECS plumbing. Accordingly, valuable externals packaging space will be created with the reduction of ECS size. Further, mechanical complexity is reduced, increasing reliability, reducing cost, and reducing maintenance requirements.

Integration of an impeller pump system with an IDP system provides for an optimized impeller sizing.

There has been provided in accordance with the instant disclosure a constant-speed pump system for environmental control system loss elimination. While the constant speed pump system has been described in the context of specific embodiments thereof, other unforeseen alternatives, modifications, and variations may become apparent to those skilled in the art having read the foregoing disclosure. Accordingly, it is intended to embrace those alternatives, modifications and variations as fall within the broad scope of the appended claims.

What is claimed is:

1. A gas turbine engine comprising:
   a fan configured to produce propulsive thrust from a fan discharge air stream,
   a bypass duct located between a cowl and an engine core, said bypass duct fluidly coupled to said fan;
   an impeller pump positioned on said engine core, said impeller pump having an intake manifold fluidly coupled to said bypass duct and configured to intake a portion of said fan discharge air stream, said impeller pump having an outlet coupled to an outlet duct fluidly coupled to an environmental control system, wherein said impeller pump is configured to raise pressure of said portion of said fan discharge air stream and pump said portion of said fan discharge air stream into said environmental control system for cooling;
   an integrated drive pump connected to said impeller pump for driving said impeller pump at a constant speed, said integrated drive pump being positioned on said engine core, said integrated drive pump being connected to a towershaft opposite said impeller pump for driving said integrated drive pump.

2. The gas turbine engine according to claim 1, further comprising said outlet duct being connected to an aircraft pre-cooler used in an environmental control system.

3. The gas turbine engine according to claim 1, further comprising a valve connected to said outlet duct for controlling flow through said outlet duct.

4. The gas turbine engine according to claim 1, further comprising a spool and said towershaft connected to said spool.

5. The gas turbine engine of according to claim 4, wherein said spool comprises a low pressure spool for driving a low pressure compressor.

6. The gas turbine engine according to claim 4, wherein said spool comprises a high pressure spool for driving a high pressure compressor.

7. The gas turbine engine according to claim 4, wherein said towershaft is connected to said spool via a drive gear.

8. The gas turbine engine according to claim 1, wherein said impeller pump comprises a centrifugal impeller pump.

9. The gas turbine engine according to claim 1, wherein said impeller pump comprises an axial pump.

10. The gas turbine engine according to claim 1, wherein said integrated drive pump is located at a tangential location on the engine core.

* * * * *